INVENTOR.
LORENZO FERRARI

United States Patent Office 2,714,825
Patented Aug. 9, 1955

2,714,825

PROGRESSIVE SPEED CONTROL

Lorenzo Ferrari, Genoa, Italy

Application March 13, 1952, Serial No. 276,349

1 Claim. (Cl. 74—689)

This invention relates to improvements in speed controls of the variable type.

The speed controls heretofore in use only partly solved the problem of providing variations thereof. In fact, they only enabled partial variations, adjustable within a limited field for every speed control and only adapted for a determined single use.

Therefore, there is a need for the production of a large and variable range of speed controls or variations which satisfy certain technical requirements and different occurring conditions in the wide field of control devices. Furthermore, prior speed controls did not always solve the problem of progressive variations as they occur, for example, in the field of gear boxes of motor vehicles where speeds are separately engaged and limited to a few variations, and in the field of electric motors, where other arrangements are used.

It is an object of the present invention to provide a device which not only avoids heretofore existing difficulties of speed controls but also thoroughly overcomes the same by enabling positive transmission and progressive control of the speed without undue rushing of driving gears with constant speed.

The aforementioned object is accomplished by providing a unit comprising a ring band or chain with links supplied with sliding oscillating or similar parts, composing a lamellar body, which may be arranged and transformed into fitting-in notches of suitable form.

Figure 5:
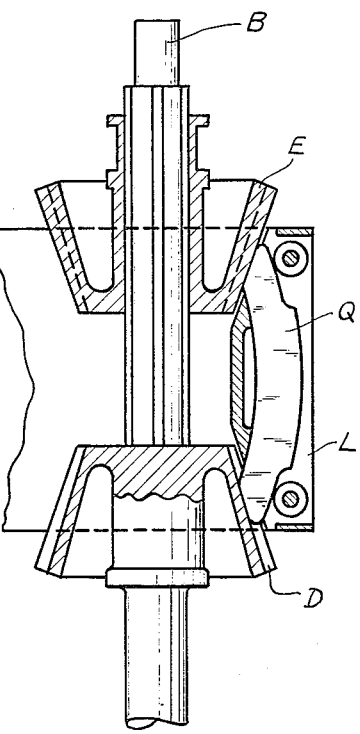
Figure 6:
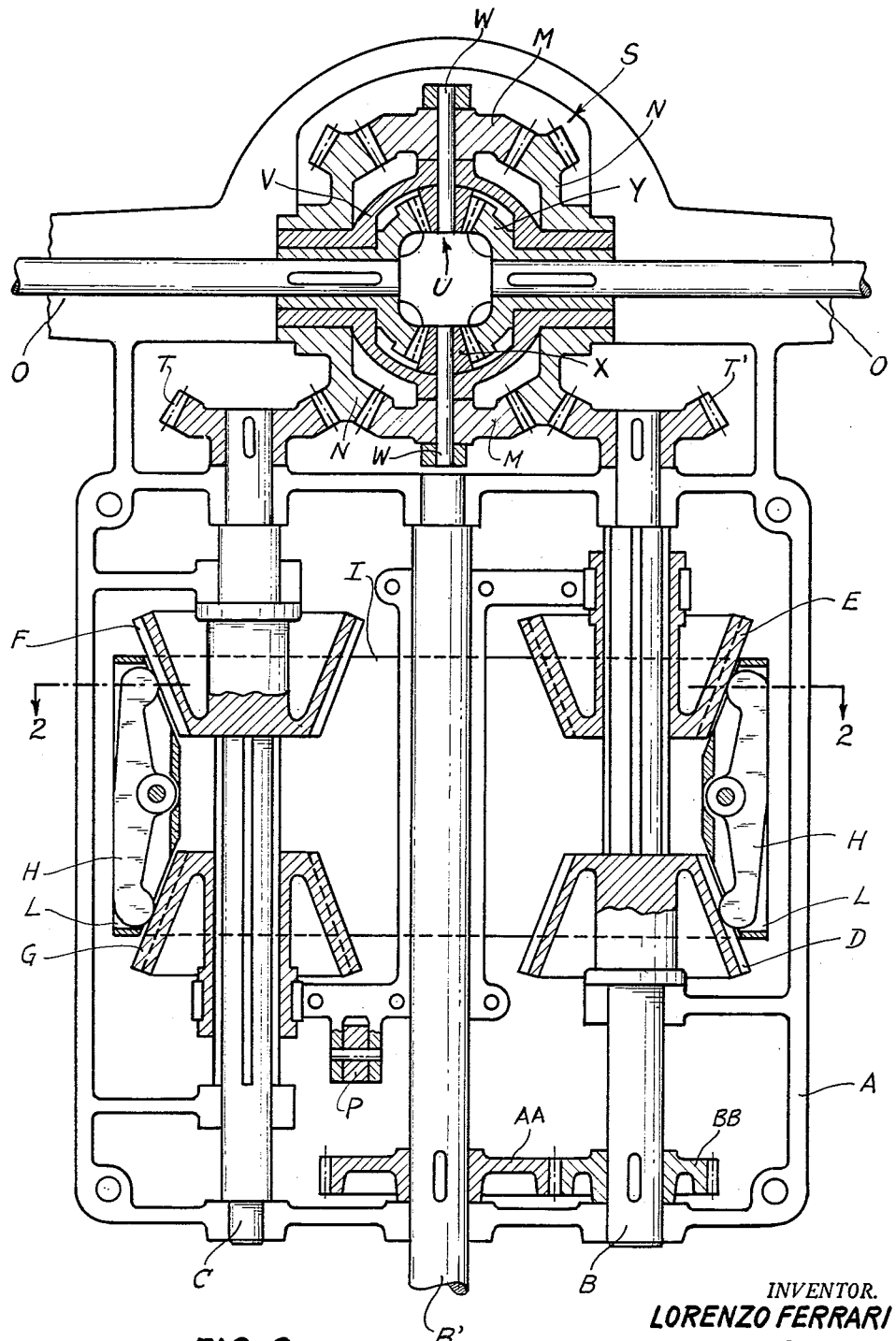

Fig. 5 is a schematic view of a modified type embodying the invention, wherein curvilinear elements are employed which slide on a circular radius, enabling contact with the toothed peripheric surfaces; and Fig. 6 is an example of a special application of the device of the invention, being a longitudinal section taken through the casing of a chain speed control, the links being fitted with lamellar elements, and directly coupled to the differential gear of a rear axle of a motor vehicle having a center driving shaft.

Referring now more in detail to the drawings, the letter A indicates the speed control case, B the motion transmitting axle, C the motion receiving shaft, D the stationary pinion, E the sliding pinion, F the other stationary pinion, G the other sliding pinion, H the set of oscillating elements, I the band or chain, L the chain-joined links, bearing the oscillating elements arranged like lamellar packets, $B^1$ the center driving axle, M the differential gear planetary pinion, N the biconical wheel mounted on the axle shatft O, P the control pedal rod or the rod of another suitable appliance, Q the curvilinear elements of the band or chain, S the differential gear of a motor vehicle. The operation of the speed control is as follows: the stationary bevel pinion D and the movable bevel pinion E are fitted on the shaft B which receives the rotary movement from a motor or driving gear. The meshing of the teeth of the pinions is arranged in stagger relation, i. e. in front of a pinion tooth notch juts out the form of a tooth of the other pinion, so that, when the oscillating lamellar elements of the chain links run on the pinions, the oscillating lamellar elements of the chain links raised on a side by the tooth height, are forced to be fitted in the notch of the opposite tooth. This outstanding feature especially assures the positive transmission of motiotn, that is, without slipping. The operation of the curvilinear elements (Fig. 5) is analagous, which, instead of oscillating, move along the radius of a circle. By approaching a couple of bevel pinions D—E and by distancing accordingly the other couple of pinions F—G through the band or chain I, made up of the ring-joined link L, fitted with special hinges and bearing the oscillating, curvilinear or other type elements, assembled like a lamellar packet H, a rotation is given to the operated or driven shaft with speed variable in relation to the driving or motor shaft, without any slipping.

Figure 1:
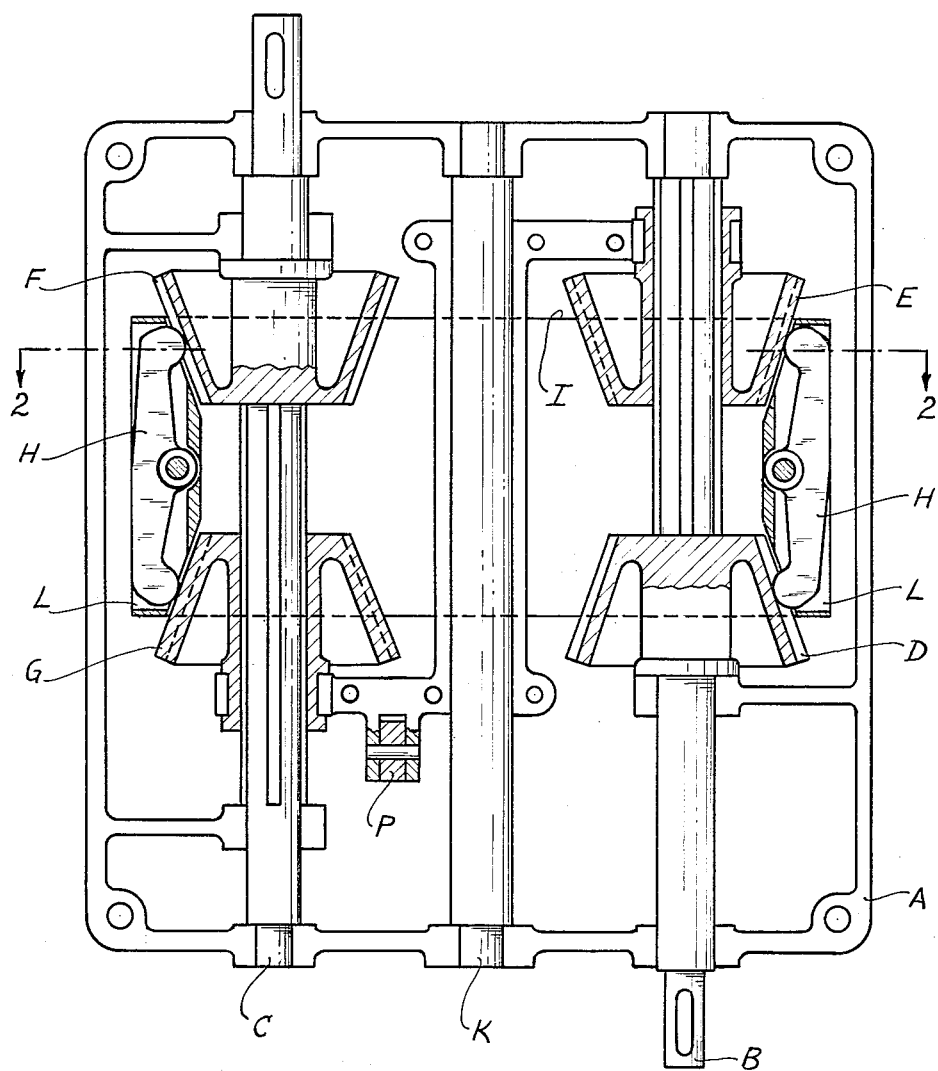
Fig. 1 is a longitudinal section of a speed control case according to the invention, including the driving and operating shafts, both being supplied with two pinions each, coupled to each other.
Figure 2:
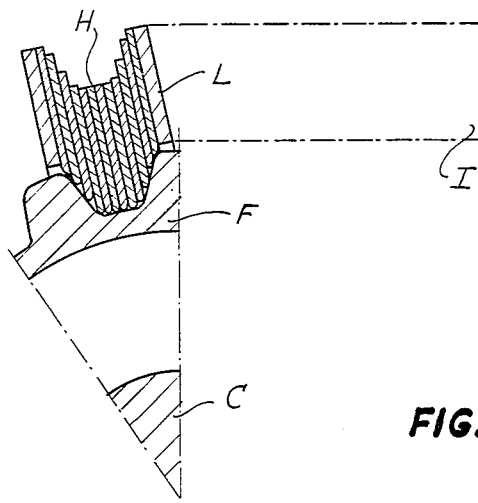
Fig. 2 is a partial schematic cross section taken on line 2—2 within the said case, showing the disposition of the oscillating parts comprising the lamellar unit in their fitting position in the notch, with trapezoidal form and round corners, i. e. between two successive teeth of bevel pinions.
Figure 2:
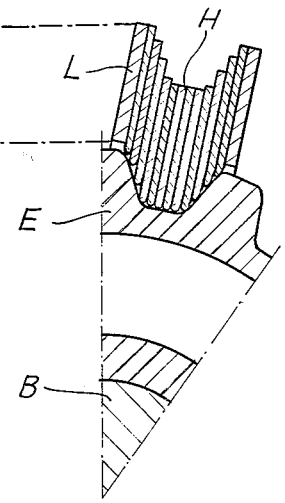
Figure 4:
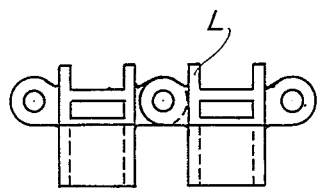
Fig. 4 is a top view of Fig. 3.
Figure 3:
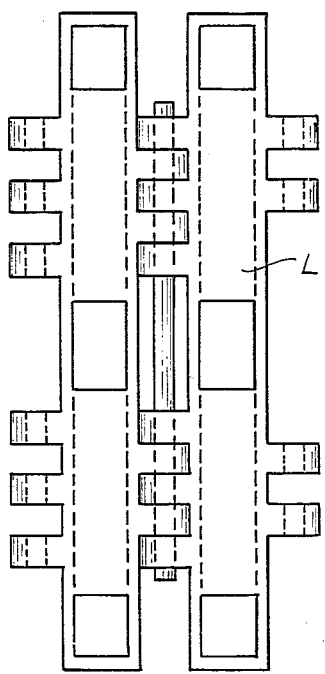
Fig. 3 is an elevational view of two hinge-like connected links.

The form of the oscillating elements may vary; however their ends turned towards the toothing of pinions should be rounded, as shown in Fig. 2, so as to assure a thorough fitting in the form of the bevel pinion teeth. In fact, when changing the 1:1 ratio, the division between the pinion toothing and that of the chain links does not agree any longer, wherefore the elements of lamellar packets will be forced to fit the teeth at random, that is, not centered but in any position, which is quite possible owing to the rounding of the ends, as stated before.

The lamellas laterally closing the packet are accordingly thicker, because they must be fit for receiving the transmission thrust discharged on the curvilinear or oscillating elements. These latter, in order to impair their friction, may be provided with vent holes or elsewise formed to reduce also the areas of contact, therefore, their friction, through the lamellas, when entering the working cycle, i. e. when they begin transmitting the motion, have already been thoroughly fitted on the pinion toothing. Should the pinions E—D and F—G be displaced by the lever of pedal P, the speed will be proportional to the longitudinal displacement of the pinions up to the limit fixed by the periphery differences.

With particular reference to the example of the application of the invention to rear axles of motor vehicles (Fig. 6), it should be said that the transmission of motion from the center motor shaft B' passes to shaft B through a couple of cog wheels, then, through the speed control device to the driven or operated shaft C. Both the motor shaft B and the driven shaft C are each fitted with a bevel pinion T and T' at the outlet of Case A, which gear with toothed biconical wheels N journalled on sleeves O of the differential gear. In their turn these biconical wheels operate both differential pinions M fitted outside on the box of a conventional rear axle differential, this box having therewithin the usual differential pinion and rim device. As a result there is provided a conical epicyclic device with the feature that the outlet speed of rotation is equal to the average difference of the ratio adjusted on the speed control with the addition that, when the ratio between both shafts B and C of the speed control is equal, the driven shafts (axle shafts) of the differential rear axle will stand still. It is also possible to obtain the reverse without any special additive gearing, by passing through the stand-still position. The above application, of course, always in the field of motor vehicles, may also be simplified inasmuch as only the operated shaft C of the speed control is provided with a bevel pinion T engaging with a bevel rim N with unilateral toothing, firmly fixed on the differential box containing the usual pinion and rim device. This would entail a regular application of the speed control, according to the device, with the coupling and direct mounting on the rear axle of motor vehicles, this technique now tending to thrive.

Referring to Fig. 6, the driving shaft B' has a pinion AA' engaging another pinion BB fixed to a partly splined shaft B, on which a conical toothed pinion E can slide longitudinally thereon to reach more or less the other conical fixed pinion D. Both cones should be so set in that before the nick of a tooth, a relief is to be found in order to throw into gear with oscillating elements H of the flexible carrier I turning around the same pinions. The pinions E and D, by means of the carrier I impart movement to the other two pinions F and G, one of which is adapted to slide or travel longitudinally on the shaft C and to be displaced relative to the other, so that when both pinions on the driving shaft B come toward each other, those pinions which are on shaft C are relatively displaced or separated, that is, pinion G will move away from pinion F and thus give rise to a periphery difference in the wheel grip, and a speed variation between driving shaft and operated shaft results thereby. Both shafts B and C have at their ends each a pinion T and T' engaged to rims N which are in turn in engagement with planet wheels M turning on a pivot W bound to the differential S of the motor vehicle, both rims turning opposite to one another.

From the foregoing it is apparent that there has been provided in a stepless variable transmission having a casing A, a driving shaft B and a driven shaft C journalled therein, the combination of gear means between the shafts comprising a first driving gear D fixed on the driving shaft B and a second driving gear E connected for turning with the driving shaft and being axially shiftable thereon, a first driven gear F fixed on the driven shaft C and a second driven gear G connected for turning with said driven shaft and being axially shiftable thereon, each gear of a shaft being tapered in direction towards the opposite gear of the same shaft, each tooth of a first gear being disposed opposite a groove of the second gear on the same shaft, means for shifting said second gears, an endless flexible carrier I surrounding said two shafts and including a series of elements H, L operable for engaging simultaneously the two gears of a shaft in all positions of the second gear thereof, whereby both gears of each shaft will be engaged by elements for transmission of rotation between said shafts, a respective bevelled pinion T, T' secured on each shaft, a first differential mechanism S including two bevel gears N at an angle to said pinions, each bevel gear N including two oppositely disposed rows of bevelled gear teeth, one row of gear teeth of each bevel gear being in mesh with a respective bevelled pinion T, T', primary planetary gears M in mesh with the opposite rows of said bevel gears, and a second differential mechanism U including a housing V having on its interior secondary planetary gear elements X, Y, said primary planetary gears being journalled externally on the housing V.

The invention may also be used as a motor vehicle steering gear, particularly of the caterpillar vehicles, thus permitting to vary progressively the rotation speed of a driving wheel in respect of the other according to the radius of the curve which one desires to run. The system shows a great advantage in comparison with the one commonly used, which, through differential and brakes, as in the case of tanks and the like, shows unrational and less positive results.

The application of the speed control according to the invention, of course, may also be vertical. Therefore, actually, the same disposes of the whole virtually unlimited field of the variation without speed jumps of any continuative driving gear, all the more so as the transmission of motion, unlike almost all other common progressive speed controls now being used, is positive, that is, without slipping.

The invention can be applied to any motion as well as to a motor vehicle, such as, for example, textile machines, carding machines, drills and other suitable machine tools.

I claim:

In a stepless variable transmission having a casing, a driving shaft and a driven shaft journalled therein, in combination, gear means between said shafts comprising a first driving gear fixed on said driving shaft and a second driving gear connected for turning with said driving shaft and being axially shiftable thereon, a first driven gear fixed on said driven shaft and a second driven gear connected for turning with said driven shaft and being axially shiftable thereon, each gear of a shaft being tapered in direction towards the opposite gear of the same shaft, each tooth of the first gear being disposed opposite a groove of the second gear on the same shaft, means for shifting said second gears, an endless flexible carrier surrounding said two shafts and including a series of elements operable for engaging simultaneously the two gears of a shaft in all positions of the second gear thereof, whereby both gears of each shaft will be engaged by elements for transmission of rotation between said shafts, a bevelled pinion secured on each shaft, a first differential mechanism including two bevel gears at an angle to said pinions, each bevel gear including two oppositely disposed rows of bevelled gear teeth, one row of gear teeth of each bevel gear being in mesh with a bevelled pinion, and primary planetary gears in mesh with the opposite rows of said bevel gears, and a second differential mechanism including a housing having on its interior secondary planetary gear elements, said primary planetary gears being journalled externally on said housing.

References Cited in the file of this patent

UNITED STATES PATENTS

| | | |
|---|---|---|
| 1,717,019 | Ferrari | June 11, 1929 |
| 2,066,758 | Bassoff | Jan. 5, 1937 |
| 2,332,838 | Borgward | Oct. 26, 1943 |
| 2,410,915 | Willmott | Nov. 12, 1946 |

FOREIGN PATENTS

| | | |
|---|---|---|
| 466,953 | Italy | Nov. 21, 1951 |
| 615,354 | France | Jan. 6, 1927 |